(12) United States Patent
Klingner et al.

(10) Patent No.: US 11,215,248 B2
(45) Date of Patent: Jan. 4, 2022

(54) FLOATING-CALIPER DISC BRAKE

(71) Applicant: KNORR-BREMSE Systeme fuer Nutzfahrzeuge GmbH, Munich (DE)

(72) Inventors: Matthias Klingner, Moorenweis (DE); Michael Peschel, Schoengeising (DE); Johann Stich, Aschenau (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 298 days.

(21) Appl. No.: 16/010,151

(22) Filed: Jun. 15, 2018

(65) Prior Publication Data

US 2018/0291971 A1 Oct. 11, 2018

Related U.S. Application Data

(63) Continuation of application No. PCT/EP2016/080832, filed on Dec. 13, 2016.

(30) Foreign Application Priority Data

Dec. 16, 2015 (DE) ...................... 10 2015 121 944.1

(51) Int. Cl.
*F16D 55/226* (2006.01)
*F16D 65/092* (2006.01)
(Continued)

(52) U.S. Cl.
CPC ............ *F16D 55/226* (2013.01); *B60T 1/065* (2013.01); *F16D 65/092* (2013.01); *F16D 65/12* (2013.01);
(Continued)

(58) Field of Classification Search
CPC ........ F16D 55/226; F16D 69/00; F16D 65/38; F16D 65/092; F16D 65/12; F16D 65/128; B60T 1/065
(Continued)

(56) References Cited

U.S. PATENT DOCUMENTS

| 4,212,376 A | * | 7/1980 | Enright ................... B23P 15/18 |
| | | | 188/218 XL |
| 4,715,486 A | | 12/1987 | Burgdorf et al. |

(Continued)

FOREIGN PATENT DOCUMENTS

| CN | 202017717 U | 10/2011 |
| CN | 103210232 A | 7/2013 |

(Continued)

OTHER PUBLICATIONS

Translation of JP 2006002855 obtained from website: https://worldwide.espacenet.com/ on Jul. 10, 2019.*

(Continued)

*Primary Examiner* — Pamela Rodriguez
(74) *Attorney, Agent, or Firm* — Crowell & Moring LLP

(57) ABSTRACT

A floating-caliper disc brake of a utility vehicle includes a brake disc, a brake carrier spanning the brake disc and having lining shafts arranged on both sides of the brake disc, a brake caliper overlapping the brake disc and movable relative to the brake carrier, brake linings arranged on both sides of the brake disc in a lining shaft of the brake carrier, and having a lining carrier plate and a friction lining attached thereto. An application-side brake lining can be pressed against the brake disc by an application device and a reaction-side brake lining can be pressed against the brake disc by a brake caliper back, by moving the brake caliper. The brake caliper can be reset by a resetting device along a wear adjustment path in an axial direction to the axis of rotation of the brake disc. With the same volume of the friction linings in the new condition, the friction lining thickness of the reaction-side brake lining is not the same as the friction lining thickness of the application-side brake lining (5).

3 Claims, 1 Drawing Sheet

(51) Int. Cl.
*F16D 65/12* (2006.01)
*F16D 65/38* (2006.01)
*F16D 69/00* (2006.01)
*B60T 1/06* (2006.01)

(52) U.S. Cl.
CPC .......... *F16D 65/128* (2013.01); *F16D 65/38* (2013.01); *F16D 69/00* (2013.01)

(58) Field of Classification Search
USPC ...... 188/71.8, 218 R, 250 B, 257, 71.7, 73.1
See application file for complete search history.

(56) References Cited

U.S. PATENT DOCUMENTS

| | | |
|---|---|---|
| 5,788,022 A | 8/1998 | Antony |
| 6,161,661 A | 12/2000 | Pahle et al. |
| 2012/0073917 A1 | 3/2012 | Lee |
| 2013/0299289 A1 | 11/2013 | Eichler |
| 2015/0192181 A1 | 7/2015 | Asen et al. |
| 2015/0354647 A1 | 12/2015 | Tironi et al. |
| 2015/0369310 A1 | 12/2015 | Inokuchi et al. |

FOREIGN PATENT DOCUMENTS

| | | |
|---|---|---|
| CN | 104956111 A | 9/2015 |
| CN | 104995425 A | 10/2015 |
| DE | 1 950 178 A | 4/1971 |
| DE | 30 33139 A1 | 4/1982 |
| DE | 38 05 994 A1 | 9/1989 |
| DE | 43 40 452 A1 | 6/1995 |
| DE | 10 2005 011 101 A1 | 9/2006 |
| DE | 10 2008 056 161 A1 | 5/2010 |
| EP | 0 329 831 B1 | 7/1991 |
| EP | 1 701 055 B1 | 9/2009 |
| GB | 971387 A | 9/1964 |
| GB | 1 201 370 A | 8/1970 |
| GB | 1 276 609 A | 6/1972 |
| GB | 2 083 146 A | 3/1982 |
| JP | 62-172831 U | 11/1987 |
| JP | 8-261262 A | 10/1996 |
| JP | 2001-522021 A | 11/2001 |
| JP | 2006-2855 A | 1/2006 |
| JP | 2012-72904 A | 4/2012 |
| WO | WO 2015/092671 A1 | 6/2015 |

OTHER PUBLICATIONS

Translation of German Patent No. DE 102008056161 obtained from website: https://worldwide.espacenet.com obtained on Aug. 12, 2020.*
International Search Report (PCT/ISA/210) issued in PCT Application No. PCT/EP2016/080832 dated Apr. 18, 2017 with English translation (four (4) pages).
German-language Written Opinion (PCT/ISA/237) issued in PCT Application No. PCT/EP2016/080832 dated Apr. 18, 2017 (six (6) pages).
German-language Office Action issued in counterpart German Application No. 10 2015 121 944.1 dated Oct. 5, 2016 (five (5) pages).
Chinese-language Office Action issued in counterpart Chinese Application No. 201680078795.5 dated Mar. 27, 2019 with English translation (11 pages).
Japanese-language Office Action issued in counterpart Japanese Application No. 2018-529235 dated Jul. 31, 2019 with English translation (eight (8) pages).
Japanese-language Office Action issued in counterpart Japanese Application No. 2018-529235 dated Jan. 15, 2020 with English translation (nine pages).

* cited by examiner

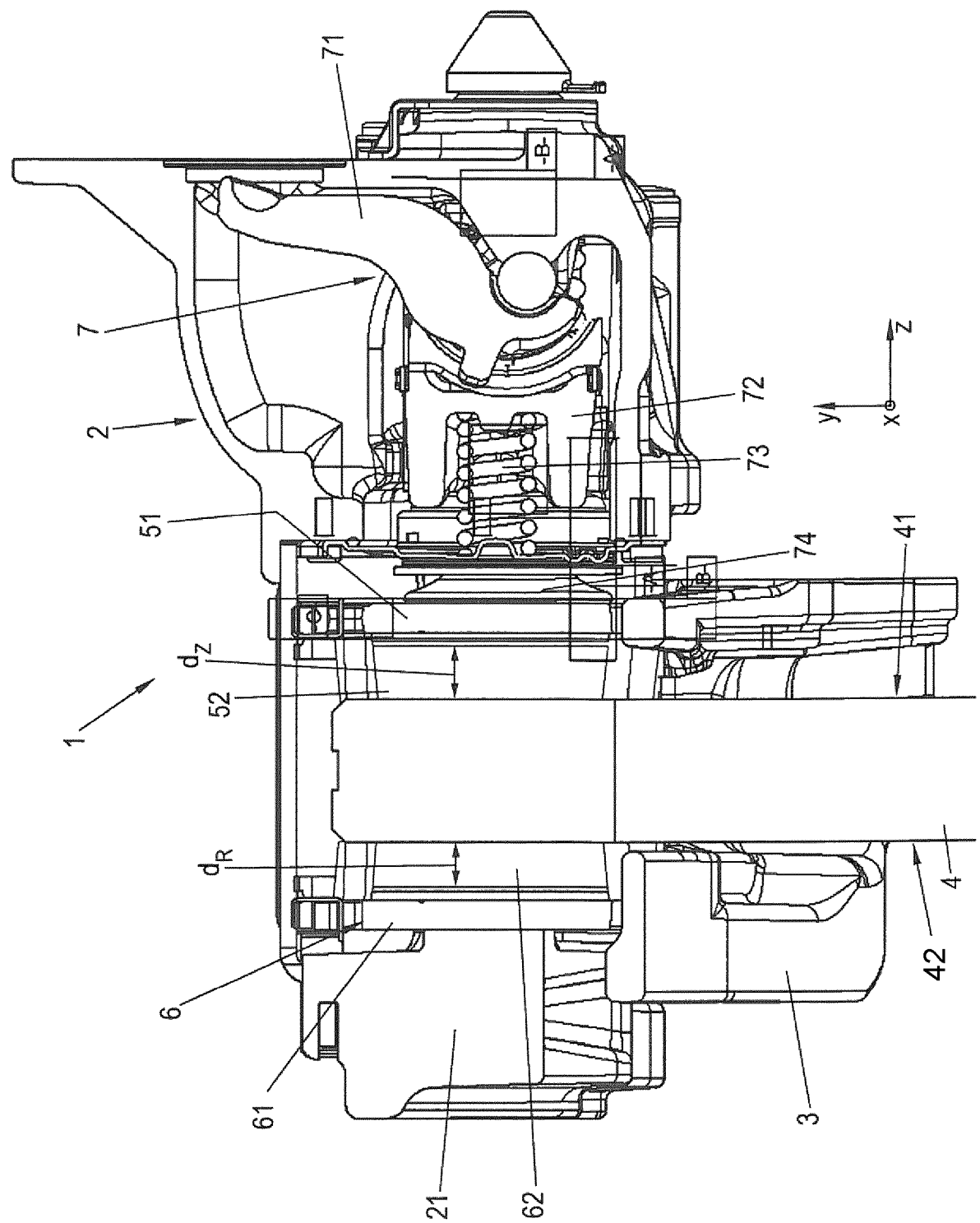

FLOATING-CALIPER DISC BRAKE

CROSS REFERENCE TO RELATED APPLICATIONS

This application is a continuation of PCT International Application No. PCT/EP2016/080832, filed Dec. 13, 2016, which claims priority under 35 U.S.C. § 119 from German Patent Application No. 10 2015 121 944.1, filed Dec. 16, 2015, the entire disclosures of which are herein expressly incorporated by reference.

BACKGROUND AND SUMMARY OF THE INVENTION

The present invention relates to a floating-caliper disc brake of a utility vehicle.

Generic floating-caliper disc brakes substantially consist of a brake disc, a fixed brake carrier spanning the brake disc with respective pad shafts for receiving brake pads arranged on both sides of the brake disc, and a brake caliper which, relative to the brake carrier, is axially displaceable relative to the axis of rotation of the brake disc. Here, an application unit and an adjusting unit are arranged in the brake caliper. During the application of the floating-caliper disc brake, thrust pieces of the application unit press against the application-side brake pad. Following the overcoming of an air gap clearance between the application-side brake pad and the brake disc, this application force is transmitted via the brake caliper to the reaction-side brake pad, wherein a caliper back of the brake pad presses the reaction-side brake pad against the brake disc.

During the course of the service life, the positioning of the brake caliper has to be adjusted with the help of the adjusting device as a consequence of the wearing of the friction linings of the brake pads and the friction ring surfaces of the brake disc.

A floating-caliper disc brake has a certain permissible wear dimension which is composed of the friction lining thicknesses of the brake pads and the thickness of the friction ring surface of the brake disc.

The friction lining thicknesses and the configuration of the brake disc are symmetrically designed so that on both sides of the brake disc the same wear dimension is present.

The object of the present invention is to be able to reduce the displacement travel of the brake caliper, with the length of service intervals in which the brake pads or the brake disc have to be replaced remaining the same.

This object is achieved by a floating-caliper disc brake comprising a brake disc, a brake carrier spanning the brake disc having pad shafts arranged on both sides of the brake disc, a brake caliper engaging over the brake disc that is displaceable relative to the brake carrier, brake pads arranged on both sides of the brake disc in a pad shaft of the brake carrier with a pad carrier plate and a friction lining attached to the same. An application-side brake pad can be pressed against the brake disc with the help of an application device and a reaction-side brake pad with the help of a brake caliper back by shifting the brake caliper against the brake disc. The brake caliper is adjustable by a wear adjustment travel axially to the axis of rotation of the brake disc with the help of an adjustment device. With an identical volume of the friction linings in a new condition, the friction lining thickness of the reaction-side brake pad is unequal to the friction lining thickness of the application-side brake pad.

The floating-caliper disc brake of a utility (commercial) vehicle according to the invention is characterized in that with identical volume of the friction linings in a new condition, the friction lining thickness of the reaction-side brake pad is unequal to the friction lining thickness of the application-side brake pad.

This makes it possible that with service intervals remaining the same, the displacement travel of the brake caliper can be reduced. The installation space advantages resulting from this can be utilized either for a higher strength of the components of the disc brake or for other components on the vehicle.

It is also contemplated to utilize the reduction of the displacement travel of the brake caliper for increasing the strength or stiffness of the brake caliper back.

Advantageous embodiment versions of the invention are described and claimed herein.

In one embodiment, the friction lining thickness of the reaction-side brake pad is less than the friction lining thickness of the application-side brake pad.

The reduction of the lining thickness of the reaction-side brake pad is particularly advantageous since, for the force introduction into the brake pad during the application, a large area is available by way of the lining contact surface of the brake caliper back.

The wear adjustment travel of the brake caliper is preferably matched to the friction lining thickness of the brake pad with the smaller friction lining thickness.

In a further embodiment, the friction ring thickness of the brake disc on the side of the brake pad with the smaller friction lining thickness is less than the friction ring thickness of the brake disc on the side of the brake pad with the greater friction lining thickness.

Because of this, the required wear adjustment travel of the brake caliper is additionally reducible by the amount of the reduction of the friction ring thickness of the brake disc.

According to a preferred embodiment, the brake disc is positioned in a brake disc opening of the brake carrier in such a manner that the distance of a friction ring surface of the brake disc facing the reaction-side pad shaft to the reaction-side pad shaft of the brake carrier is less than the distance of a friction ring surface of the brake disc facing the application-side pad shaft to the application-side pad shaft of the brake carrier.

A further advantage of this embodiment is obtained in that through the reduction of the friction ring thickness of the brake disc, the mounting of the brake disc relative to the wheel of the utility vehicle can be shortened.

An enlargement of the friction surface accompanying the reduction of the friction lining thickness of one of the friction linings with the volume of the friction lining remaining the same has the further advantage that the risk of a heat crack of the brake disc is diminished.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a lateral sectional view through a part of a floating-caliper disc brake.

DETAILED DESCRIPTION OF THE DRAWINGS

In the following FIGURE description, terms such as top, bottom, left, right, front, back etc. are exclusively applicable to the exemplary representation and position of the disc brake, of the brake disc, of the brake carrier, of the brake caliper, of the brake pads and the like selected in the respective figures. These terms must not be understood to be restrictive, i.e. these references can change through different working positions or the mirror-symmetrical interpretation or the like.

In FIG. 1, a part of a floating-caliper disc brake of a utility (commercial) vehicle as a whole is marked with the reference number 1. The floating-caliper disc brake comprises a brake disc 4 and a fixed brake carrier 3 which spans the brake disc 4 frame-like, and a brake caliper 2 that is displaceable in a direction z, which corresponds to the brake disc axis of rotation, relative to the brake carrier 3.

Here, the brake carrier 3 comprises, viewed in the direction z, carrier horns on both sides of the brake disc 4 which extend in the y-direction and serve for supporting the brake pads 5, 6 in the circumferential direction of the brake disc 4. The carrier horns on each side of the brake disc 4 together with a respective web connecting the carrier horns with one another form a pad shaft in which the brake pads 5, 6 are received.

The brake caliper 2 engages over the brake disc 4, wherein on a side of the brake disc 4 facing away from the wheel an application device 7 is received in the brake caliper 2. On a side of the brake disc 4 facing the wheel, the brake caliper 2 has a brake caliper back 21.

The application device 7 substantially comprises a brake lever 71, which is actuatable with the help of a brake cylinder (not shown) of the floating-caliper disc brake 1 and which for applying the disc brake is pressed against a bridge 72. The bridge 72 in turn presses onto threaded tubes (which are not shown here) with thrust pieces 74 arranged at their ends, which press the application-side brake pad 5 against the brake disc 4.

Following the overcoming of an air gap clearance between the brake pad 5 and the brake disc 4, the force exerted in the process is transmitted via the brake caliper 2 onto the reaction-side brake pad 6, wherein the brake caliper 2 in the process moves in the direction z towards the application side of the brake caliper 2.

Following completed braking, a compression spring 73 of the application device 7 presses the bridge 72 together with the threaded tube and the thrust piece 74 back into the starting position.

Furthermore, in the region of the application device 7, an adjustment device is provided in the brake caliper 2, with which the position of the brake caliper 2 is axially adjustable by a wear adjustment travel relative to the axis of rotation of the brake disc 4, i.e. in the direction z.

Each of the brake pads 5, 6 consists of a pad carrier plate 51, 61 and a friction lining 52, 62 attached to the same. As shown in FIG. 1, the thickness $d_R$ of the reaction-side brake pad 6 is unequal to the friction lining thickness $d_Z$ of the application-side brake pad 5. The volume of the friction linings 52, 62 of the application-side brake pad 5 and of the reaction-side brake pad 6 in this case is equal in particular in a new condition of the brake pads 5, 6.

In particular, the friction lining thickness $d_R$ of the reaction-side brake pad 6 is less than the friction lining thickness $d_Z$ of the application-side brake pad 5.

The side of the disc brake 1 viewed from the brake disc 4 in the z-direction, on which the application device 7 in the brake caliper 2 is arranged, is referred to as the application side. The other side of the brake disc 1 facing a vehicle wheel of the utility (commercial) vehicle, on which the brake caliper back 21 is located, is referred to as the reaction side.

As is further evident in FIG. 1, the friction ring thickness of the brake disc 4 on the side of the reaction-side brake pad 6, i.e. the side of the brake pad with the smaller friction lining thickness $d_R$, is less than the friction ring thickness of the brake disc 4 on the side of the application-side friction lining 5 with the greater friction lining thickness $d_Z$.

The wear adjustment travel of the brake caliper 2 is suitably matched to the smaller friction lining thickness $d_R$ of the reaction-side brake pad 6.

Particularly preferably, the brake disc 4 is positioned in the brake disc opening of the brake carrier 2 in such a manner that a friction ring surface 42 of the brake disc 4 facing the reaction-side pad shaft is nearer to the reaction-side pad shaft of the brake carrier 3 than a friction ring surface 41 of the brake disc 4 facing the application-side pad shaft.

The reduction of the friction lining thickness $d_R$ of the reaction-side brake pad 6 is particularly advantageous since, for the force introduction into the brake pad 6 during the application of the disc brake 1, a very large pressure surface is available by way of the lining contact surface in the brake caliper back 21, which makes possible uniform pressing against the friction lining 62 of the reaction-side brake pad 6 that is enlarged in the area perpendicularly to the direction z relative to the friction lining 52 of the application-side brake pad 5.

Altogether, the reduction of the friction lining thickness $d_R$ of the reaction-side brake pad 6 and, if appropriate of the friction ring thickness of the brake disc 4, results in a reduction of the displacement travel of the brake caliper and thus an enlargement of the installation space of the disc brake that can be utilized for other purposes.

LIST OF REFERENCE CHARACTERS

1 Floating-caliper disc brake
2 Brake caliper
21 Brake caliper back
3 Brake carrier
4 Brake disc
41 Friction ring surface
42 Friction ring surface
5 Brake pad
51 Pad carrier plate
52 Friction lining
6 Brake pad
61 Pad carrier plate
62 Friction lining
7 Application device
71 Brake lever
72 Bridge
73 Compression spring
74 Thrust piece
dR Thickness reaction-side friction lining
dZ Thickness application-side friction lining The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A floating-caliper disc brake of a utility vehicle, comprising:
a brake disc;

a brake carrier spanning the brake disc having pad shafts arranged on both sides of the brake disc;

a brake caliper engaging over the brake disc that is displaceable relative to the brake carrier;

brake pads arranged on both sides of the brake disc in a respective pad shaft of the brake carrier, each brake pad having a pad carrier plate and a friction lining attached to the same, wherein an application-side brake pad is pressable against the brake disc via an application device and a reaction-side brake pad is pressable via a brake caliper back by shifting the brake caliper against the brake disc, the brake caliper is adjustable by a wear adjustment travel axially to an axis of rotation of the brake disc via an adjustment device, with an identical volume of the friction linings in a new condition, a friction lining thickness of the reaction-side brake pad is unequal to a friction lining thickness of the application-side brake pad, the friction lining thickness of the reaction-side brake pad is less than the friction lining thickness of the application-side brake pad, and a friction ring thickness of the brake disc on a side of the brake pad with the smaller friction lining thickness is less than a friction ring thickness of the brake disc on the side of the brake pad with the greater friction lining thickness.

2. The floating-caliper disc brake as claimed in claim 1, wherein a wear adjustment travel of the brake caliper is matched to the smaller friction lining thickness of the brake pad with the smaller friction lining thickness.

3. The floating-caliper disc brake as claimed in claim 1, wherein the brake disc is positioned in a brake disc opening of the brake carrier such that a distance of a friction ring surface of the brake disc facing the reaction-side pad shaft to the reaction-side pad shaft of the brake carrier is less than the distance of a friction ring surface of the brake disc facing the application-side pad shaft to the application-side pad shaft of the brake carrier.

* * * * *